Oct. 11, 1960

J. BRAUMILLER, JR., ET AL 2,955,473

GYRO CONTROL SYSTEM

Filed March 28, 1956

INVENTOR.
JACK BRAUMILLER
KENNETH D. COWAN
EUGENE KRAWZAK
BY
Wade Kooty
ATTORNEY
Alfred L. Brody
AGENT

INVENTOR.
JACK BRAUMILLER
KENNETH D. COWAN
EUGENE KRAWZAK

United States Patent Office 2,955,473
Patented Oct. 11, 1960

2,955,473

GYRO CONTROL SYSTEM

Jack Braumiller, Jr., Linthicum, and Kenneth D. Cowan, West Severna Park, Md., and Eugene Krawzak, Pittsburgh, Pa., assignors, by mesne assignments, to the United States of America as represented by the Secretary of the Air Force Filed Mar. 28, 1956, Ser. No. 574,569

4 Claims. (Cl. 74—5.6)

The present invention relates to a gyro control system and more specifically to gyro-controlled electrical circuitry which includes a variable reluctance pickoff with an improved adjusting and clamping arrangement for the E-iron member of said pickoff.

Previous arrangement of similar devices have proven undesirable because of such factors as difficulty in manufacturing, inconsistencies in results after assembly and failure to pass vibrational tests. In view of the aforementioned undesirable factors, a prime source of difficulty has been the error induced by the final tightening of the clamp after necessary adjustments have been made.

In order to determine optimum conditions for proper alignment, a series of conclusive tests of the electrical characteristics and requirements of the variable reluctance pickoff has been made and the following conclusions have been noted:

(1) The gap between the E-iron and the I-iron of said pickoff must be set ot provide a specific gain.

(2) Said gap setting will not be the same for all gyros.

(3) The summation of tolerances in the manufacture of the gyros is inconsistent and, therefore, a fixed gap setting is incompatible with the electrical requirements.

The gain of the gyro is defined as the change in output voltage due to the deflection between zero and ± 1.5 degrees of the gimbal assembly. Under actual test conditions, a high degree of accuracy has been attained through the use of an optical lever to measure the angular deflection and a vacuum tube voltmeter which indicates small unbalances in output voltage by switching from one secondary coil of the E-iron member to the other. This output voltage is the differential of the full wave rectification of the two A.C. voltages appearing across the secondary coils of said E-iron assembly.

The aforementioned tests have shown the need for an adjustable type clamping device which will overcome the various difficulties as previously enumerated.

One feature of the present invention is that it permits assembly, clamping and more accurate adjustments to be made of a variable reluctance pickoff, in less time than previous methods.

An additional feature of the present device is its stronger clamping action and the greater support afforded to the E-iron assembly than previous devices made for silimar purposes.

The above and further features and advantages of the invention will appear more fully hereinafter from the detailed description which follows and as considered in conjunction with the accompanying drawings, wherein one of several possible embodiments of the invention is shown.

In the drawings wherein like reference characters refer to like parts throughout the several views—

Fig. 3a is a sectional view taken on line 3a—3a of Fig. 3;

Figure 3:
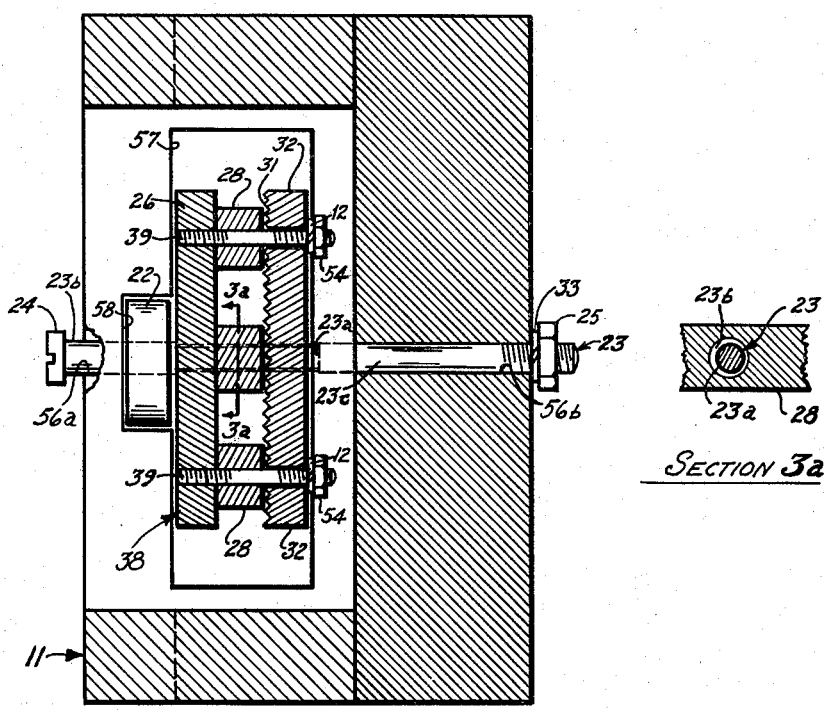
Fig. 3 is a sectional view of Fig. 2, taken in the direction of the arrows, along line 3—3.
Figure 2:
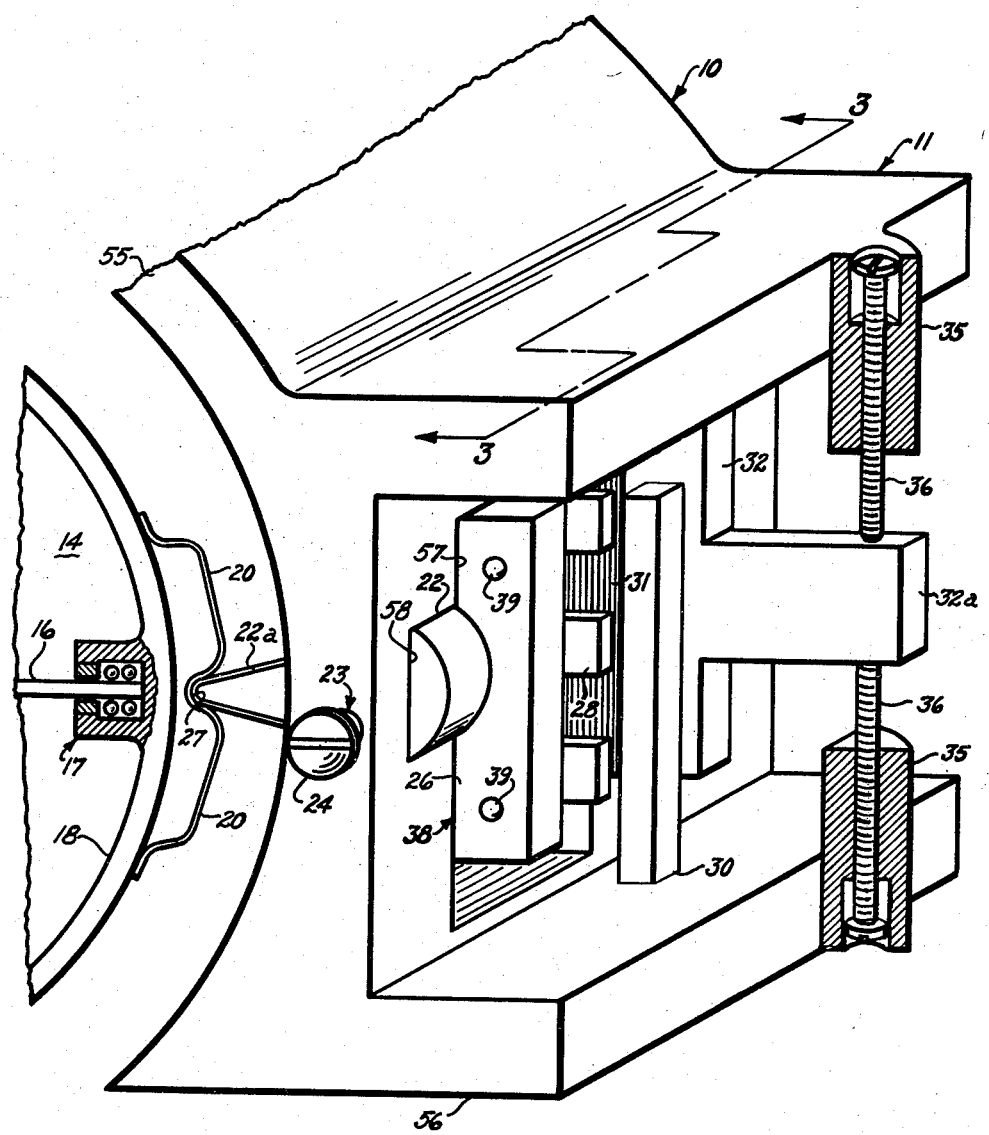
Fig. 2 is a perspective view, partly in section of the variable reluctance pickoff assembly.
Figure 4:
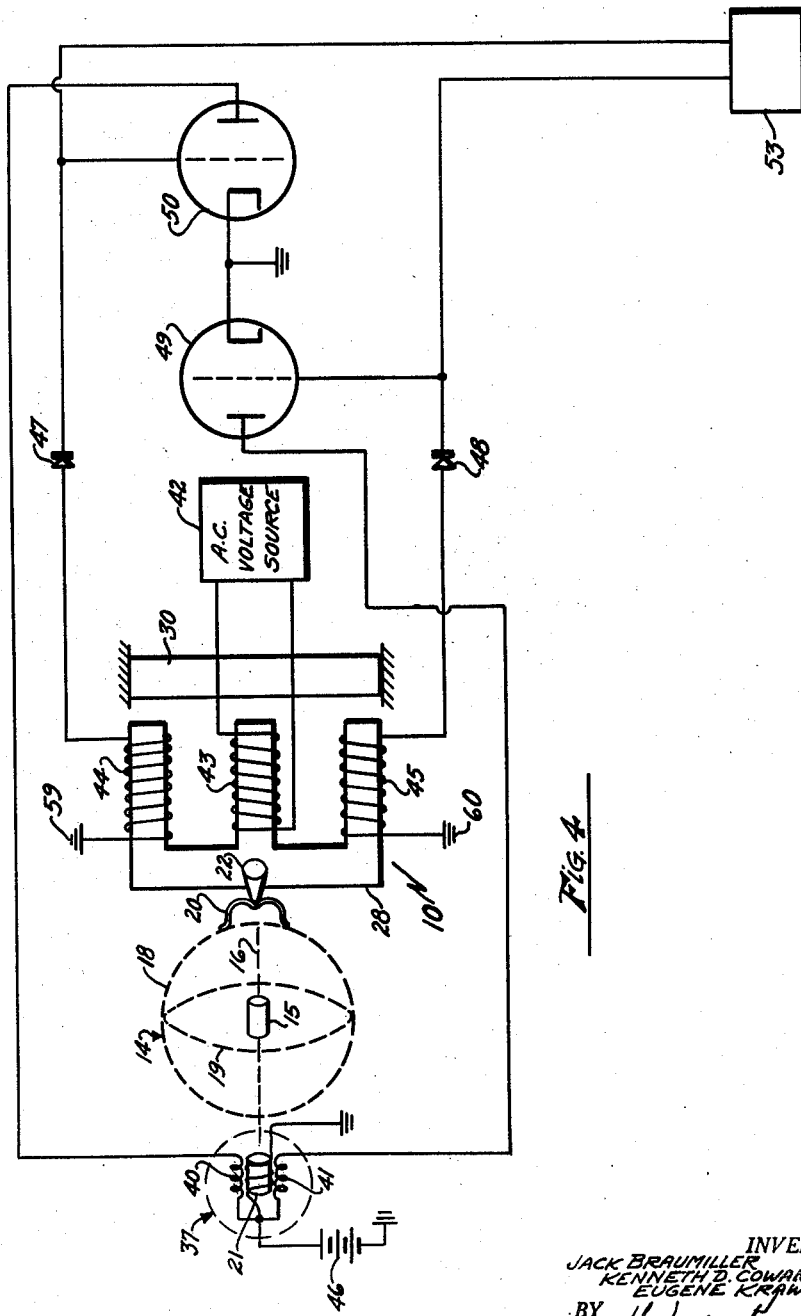
Fig. 4 is an electro-mechanical schematic diagram including circuitry responsive to the operation of a gyro, which circuitry also incorporates a feedback loop type of servo control for said gyro.

As seen in Figs. 2, 3 and 4, the invention comprises a signal generator 10 including a gyro 14, a frame 11 and a variable reluctance pickoff assembly 55—56 within frame 11 and responsive to precession of the gyro 14.

The gyro 14 comprises a gimbal assembly including a pair of gimbal rings 18 and 19, said rings being disposed so that they intersect one another at an angle of 90°. Said rings 18 and 19 are pivotally secured to one another at their points of intersection (not shown). A gyro rotor 15 is mounted on bearing assemblies 17 affixed to opposite sides of the inner perimeter of gimbal ring 18. The outer circumference of ring 18 is provided with a laterally disposed, centrally depressed cam surface 20.

Frame 11 surrounds a cylindrical gyro housing 55 and a C-shaped pickoff assembly housing 56. Aligned rectangular recesses 57 and 58 are formed within the sides of the web of said C-shaped housing 56.

The variable reluctance pickoff assembly includes an E-iron assembly 38 which comprises a clamp member 26, an E-iron member 28, and a block member 32.

A cam follower 22 is provided with an elongated pointer-like portion 22a and said follower is fixed to a cam shaft 23 intermediate of its length. The tip of pointer-like portion 22a normally rests within the valley 27 between the two halves of the centrally depressed cam surface 20, when the present device is completely assembled, as subsequently will be described.

Cam follower 22 is positioned on housing 56 within the small rectangular recess 58 and E-iron assembly 38 is positioned within the larger rectangular recess 57. Said E-iron assembly 38 snugly fits between the vertical walls of recess 57; however, a substantial space is provided between the respective top and bottom edges of said assembly 38 and recess 57.

The members of the E-iron assembly 38 comprising clamp member 26, E-iron member 28 and block member 32 are each provided with a pair of aligned apertures to receive a pair of studs 39. A pair of lock washers 12 and nuts 54 are threadedly fastened to the ends of studs 39 to secure said members of the E-iron assembly into a unit. The block member 32 is provided with serrations 31 along its inner surface so as to firmly grip the abutting E-iron member 28 between said block member 32 and clamp member 26.

Aligned circular apertures are provided through the central web portion of C-shaped housing 56, on either side of recesses 57 and 58, through cam follower 22, clamp member 26, E-iron member 28 and block member 32. The cam shaft 23 penetrates each of the aforementioned apertures and is provided with a slotted head member 24 which engages one edge face of the web of the C-shaped housing 56, while a lock washer 33 and a tightening nut 25 abut the other edge face of housing 56.

Furthermore, shaft 23 is provided with an eccentric portion 23a (see Fig. 3a), having a smaller cross-sectional area than the remaining portions 23b and 23c of said shaft and which are positioned within the apertures of members 26, 28 and 32. The apertures 56a and 56b, within the web of C-shaped housing 56, are dimensioned so as to provide a running fit for the portions 23b and 23c of shaft 23 positioned therein.

An I-iron member 30 is positioned between the legs of the C-shaped housing 56 and is supported on the surrounding frame 11 in alignment with and in close proximity to the three legs of the E-iron member 28. The ends of said I-iron member 30, as illustrated in schematic fashion in Figs. 1 and 4, are held in brackets 11 secured to an outer housing (not shown) that surrounds inner housing 55 and supports the latter for limited rocking motion therewithin, so that the E-iron assembly 28 (along with housing 55, 56) may rock to a corresponding degree in relation to the I-iron element 30, under the circumstances hereinafter more fully described.

Block member 32 is provided with an elongated extension 32a extending from the web and parallel to and between the legs of the C-shaped housing 56. A pair of semi-cylindrical aligned bosses 35 are formed integrally with the outer edge of each leg of the C-shaped mounting housing 56 and extend inwardly and parallel to the web of said housing 56. Extension 32a is so dimensioned and positioned so as to be more or less centered between said bosses 35 by a pair of adjusting screws 36 threadedly located in each of said bosses 35.

Figure 1:
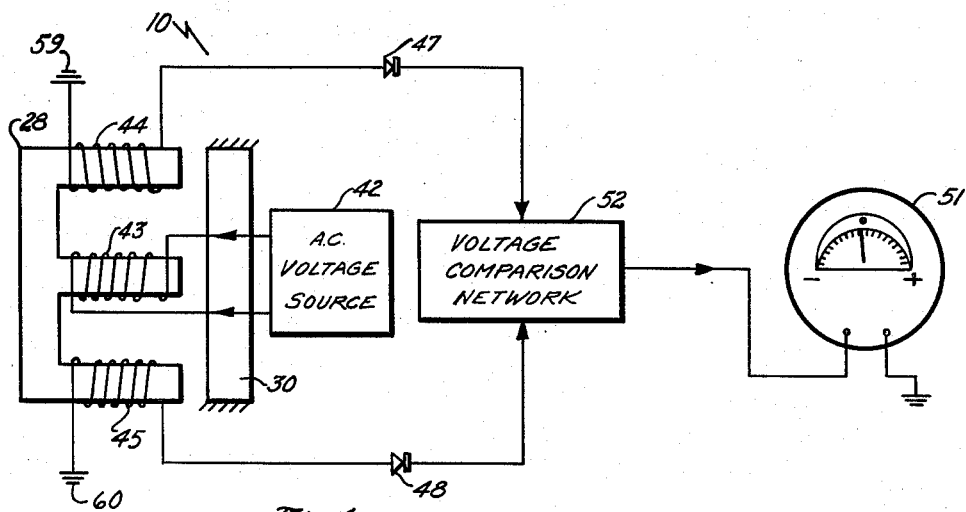
Fig. 1 is a schematic diagram of circuitry that may be utilized for lining up the variable reluctance pickoff.

As seen in Figs. 1 and 4, the two outer legs of E-iron member 28 each have wound thereabout a secondary coil 44 or 45, and one end of each of said coils 44 and 45 is attached to ground at 59 and 60, respectively, while the other ends thereof are attached to the input side of rectifiers 47 and 48, respectively. The center leg of E-iron member 28 is provided with a primary coil 43 which induces a voltage in secondary coils 44 and 45 through the media of an A.C. voltage source 42.

In order properly to align the present device, the E-iron assembly 38 is first inserted within recess 57, cam follower 22 is inserted in recess 58 and cam shaft 23 is inserted through the aligned apertures through the web of C-shaped pickoff housing 56, cam follower 22, and the members of the E-iron assembly 38. The end of cam shaft 23 and studs 39 are secured by nuts 25 and 54 and lock washers 33 and 12, respectively, and then drawn up snugly. Coils 43, 44 and 45, which are wound around each of the legs of E-iron members 28, are then connected into the electrical circuit, shown in Fig. 1 which is constituted in a manner to facilitate the pickoff aligning procedure.

Upon turning shaft 23, by means of its slotted head 24, the apertures 56a and 56b will act as bearings for said shaft 23 and the eccentric portion 23a of said shaft will abut portions of the apertures within members 26, 28 and 32a to move the E-iron assembly 38 laterally, in selective fore and aft positions with respect to I-iron member 30, until a specific gain is established.

With the cam shaft 23 acting as a fulcrum, the output voltages of secondary coils 44 and 45 are balanced by positioning the E-iron assembly 38 with the two adjusting screws 36 which engage extension 32a of block member 32. Said screws 36 are alternately tightened until a balance output is achieved and both screws 36 are under tension. The nuts 54 and 25 on studs 39 and cam shaft 23, respectively, are then given a final tightening, which does not affect the position of the E-iron assembly 38.

As shown in Fig. 1, the electrical circuit includes (in addition to the coils 43, 44 and 45, above referred to) an A.C. voltage source 42 which is applied to the primary coil 43. Secondary coils 44 and 45, wound about the remaining legs of said E-iron member 28, are grounded at 59 and 60, respectively. The opposite ends of each secondary coil 44 and 45 are electrically connected to the input sides of diodes 47 and 48. The lateral and pivotal positioning of E-iron assembly 38 by movement of cam shaft 23 and adjusting screw 36 will vary the air gap between one or the other of the legs of said member 28 and the I-iron member 30. Since a voltage will be induced in each coil 44 and 45 inversely proportional to the area of the gap, the leg of E-iron member 28 nearest I-iron member 30 will induce the greater of the two voltages. These two voltages will be fed through rectifiers 47 and 48 to a voltage comparison network 52. The difference of the voltages induced in the secondary coils 44 and 45 will then be transmitted to voltmeter 51. A reading in a negative direction of voltmeter 51 might indicate a greater voltage induced in coil 44 and a reading in the positive direction might indicate a greater voltage induced in coil 45. A zero reading of voltmeter 51 indicates equal voltages in each of coils 44 and 45 and that E-iron assembly 38 is properly orientated. Obviously, such adjustment is accomplished by turning one or the other of screws 36.

After the variable reluctance pickoff assembly is properly orientated, it may be electrically connected into a feedback type of gyro control circuit, as shown in Fig. 4. When the gyro rotor 15 is rotating about its spin axis 16 at such a speed that gyro 14 is properly positioned for the desired heading, the cam surface 20 is so positioned so that the cam follower 22 will cause equal voltages to be induced in each of coils 44 and 45. Such voltages will then be applied to the grids of a push-pull arrangement comprising triodes 49 and 50. The plates of triodes 49 and 50 will then apply equal voltages to the field windings 41 and 40, respectively, of a reversible motor 37. Since the rotor 21 of motor 37 is fixed to the spin axis 16 of gyro 14, rotation of rotor 21 will cause an equal rotation of rotor 15. With equal voltages across windings 40 and 41, the rotors 15 and 21 will then both rotate at a normal fixed speed.

If, however, the gimbal ring 18 of gyro 14 does move from its initial position, the movement of ring 18 will proportionally move cam surface 20 in either a clockwise or a counter-clockwise direction. Cam follower 22 will then be proportionally rotated to tilt E-iron member 28 in a complementary manner. The tilting action of the E-iron member 28 will then cause unequal gaps between the two end legs of said E-iron member 28 and the fixed I-iron member 30. The leg of member 28 having the smaller gap will cause a greater voltage to be induced in its secondary coil as compared with the voltage induced in the other secondary coil. The coil with the smaller gap will then apply a voltage to the grid of its respective triode 49 or 50, and then generate a voltage of proportional magnitude to accelerate the rotation of the rotor 21 of motor 37 a proportional amount. The rotor 21, by means of its common connection of axis 16 with rotor 15 will then speed up rotor 15 a sufficient amount to bring gimbal ring 18 back to its initially orientated position.

In the circuit of Fig. 4, the plates of both triodes 49 and 50 are connected to the high side of a common B+ voltage source 46 and which is grounded at its low side. The cathodes of each of tubes 49 and 50 are also commonly grounded.

A utilization circuit 53 may be connected in series with the grids of triodes 49 and 50 so that the difference of voltage therebetween may, for example, control the steering mechanism of an aircraft, in accordance with the position of gyro 14.

The above-described apparatus constitutes an adjustable type of clamping device which is effective to overcome the various prior art difficulties heretofore mentioned. This device has been tested and found efficient for the purpose indicated, and has proven successful in angular rate control, automatic pilot controls and 3-axis rate control of automatic pilot controls.

While there is above-described but one embodiment of the invention, the same is capable of many modifications and changes without departing from the spirit of the invention and it is not desired, therefore, to place any limitations on the invention other than as pointed out in the following claims.

What is claimed is:

1. A signal transmitting mechanism comprising a pair of complementary elements having relative movement therebetween, clamping means adjustably secured to one of said complementary elements for unitary movement therewith, a support means having a recess therein, said support means, said one of said elements and said clamping means having aligned apertures therethrough, means including a shaft penetrating said aligned apertures for retaining said one of said elements and said clamping means within said recess, means for adjusting the position of said one of said elements with respect to the other of said elements to establish a specific gap therebetween, and means for causing limited rotation between said one of said elements and said support means.

2. A mechanism as defined in claim 1, wherein said shaft includes an eccentric portion positioned within said one of said elements and clamping means, and operative to provide selective lateral spacing between said complementary elements.

3. A mechanism as defined in claim 2, wherein said clamping means comprises a clamp member and a block member, fastening means securing one of said elements between said clamp and block members, and wherein said means for adjusting said one of said elements with respect to said other of said elements comprises a pair of adjusting screws threadedly secured on said support means and co-operating with said block member to selectively pivot the latter.

4. A mechanism as defined in claim 1, wherein said last-named means comprises a cam follower connected to move with said shaft, a gyro having a spin axis, a rotor thereon and a gimbal ring assembly secured to said support means, a cam surface fixed to the outer periphery of said gimbal ring assembly and engageable with said cam follower, a feedback loop between said one of said elements and said gyro, whereby deviations from said specific gap, through movement of the gimbal ring assembly, cam surface, cam follower and said one of said elements will be reflected by a proportional compensating change of position of said gimbal ring assembly.

References Cited in the file of this patent

UNITED STATES PATENTS

| | | |
|---|---|---|
| 2,345,169 | Wunsch et al. | Mar. 28, 1944 |
| 2,429,612 | Curry | Oct. 28, 1947 |
| 2,511,178 | Roters | June 13, 1950 |
| 2,537,844 | Meredith | Jan. 9, 1951 |
| 2,672,054 | Warren et al. | Mar. 16, 1954 |
| 2,790,119 | Konet et al. | Apr. 23, 1957 |